S. KILMINSTER.
HANDLE HOLDER.
APPLICATION FILED APR. 12, 1919.
1,333,494.
Patented Mar. 9, 1920.
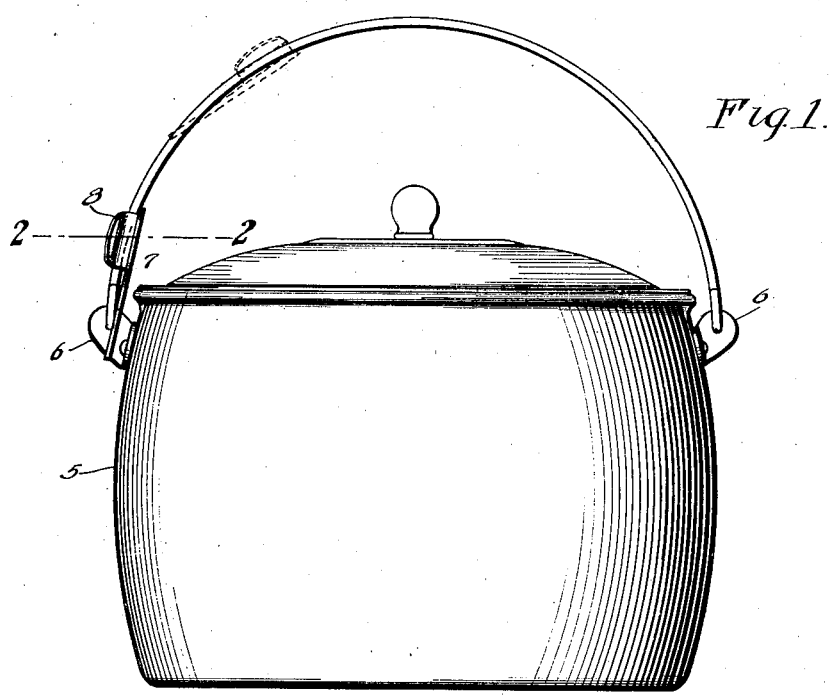
Fig. 1.
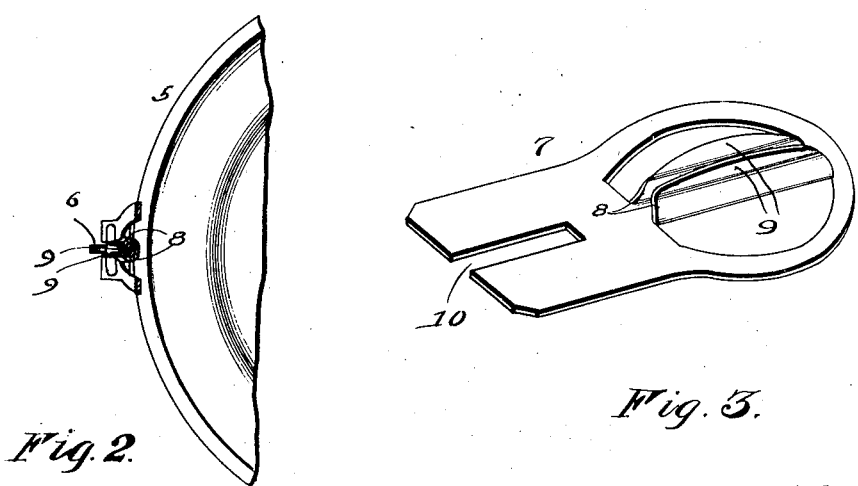
Fig. 2.
Fig. 3.
Witnesses
W. A. Thomas
Inventor
Stanley Kilminster
By Victor J. Evans
Attorney

UNITED STATES PATENT OFFICE.

STANLEY KILMINSTER, OF GREAT FALLS, MONTANA.

HANDLE-HOLDER.

1,333,494.  Specification of Letters Patent.  Patented Mar. 9, 1920.

Application filed April 12, 1919. Serial No. 289,565.

*To all whom it may concern:*

Be it known that I, STANLEY KILMINSTER, a citizen of the United States, residing at Great Falls, in the county of Cascade and State of Montana, have invented new and useful Improvements in Handle-Holders, of which the following is a specification.

Handles of cooking utensils, such as pots and kettles are hingedly connected to such utensils so that the same rest directly thereagainst, and as a consequence absorb heat from such utensil and the stove upon which the utensil is heated. To obviate, as much as possible, the heating of such handles, what is known as a cold handle has been devised. Such handles comprise a coiled wire member or a handle having its central portion provided with a separate wire which is coiled therearound. Even these devices do not retain the handle in a cold condition, and frequent injury is inflicted to the hand of the house wife in handling such utensils. It is the object of the present invention to provide a means which shall be slidably arranged upon a handle for a cooking utensil whereby the same may be brought to engage with the ear or eye to which the handle is pivotally connected, so as to retain the handle in a vertical position, or at a right angle with respect to the utensil upon which it is arranged, and consequently out of direct path of the heat emitted therefrom and the heat emitted from the stove on which the utensil is placed.

It is a still further object of the present invention to produce an article of manufacture which may be arranged on any handle of ordinary utensils and which will effectively retain the handle outward of the utensil so that the same is held free from contact with the utensil, and consequently will not become heated from such utensil when the latter is heated.

Other objects and advantages will present themselves as the nature of the invention is better understood, reference being had to the accompanying drawing, in which:

Figure 1 is a view of a utensil provided with the improvement.

Fig. 2 is a sectional view approximately on the line 2—2 of Fig. 1.

Fig. 3 is a perspective view of the improvement.

In the drawings I have illustrated an ordinary pot or kettle which is designated by the numeral 5. The kettle, adjacent the top thereof may be provided with ears or eyes 6 to which the ends of the bail-shaped handle is pivotally connected. My improvement is designed to engage with the element to which the handle is pivoted, regardless if such element is in the nature of an ear or in the nature of an eye. The handle is of the ordinary construction, being formed from a strand of wire which is round in cross section, and the improvement is broadly indicated by the numeral 7. The improvement is constructed from a single plate of metal and is substantially rectangular in plan. The plate, at one end thereof, is slitted from opposite points in a curved line, and the metal bounded by the said slits is bent outwardly providing jaws 8—8. These jaws have their outer edges flared away from each other, as indicated by the numeral 9, and between these jaws the handle of the utensil is received. The plate, outward of the jaws is centrally formed with a slot 10, and this slot is adapted to engage with the eye or ear of the utensil to which the handle is pivoted. By reference to the dotted lines in Fig. 1 of the drawings, it will be noted that the improvement may be moved out of engagement with the ear or eye of the utensil when it is desired to swing the handle against the utensil, or when the utensil is stored, and by reference to the full lines of the said Fig. 1 it will be seen that the slot engages with the ear or eye of the utensil and retains the handle thereof in a vertical position with respect to the utensil so that the same will not absorb the heat to which the utensil is subjected.

It is believed, from the foregoing description, when taken in connection with the drawings, the simplicity of the construction and the advantages thereof will be readily apparent without further detailed description.

Having thus described the invention, what is claimed as new, is:—

1. As a new article of manufacture, means for retaining a handle in determined position with respect to the vessel to which it is pivotally secured, said means comprising a metallic plate, said plate being slitted from opposite points at a curvature, and the metal between the slits being bent to provide co-acting jaws, said jaws having their outer ends flared outwardly, and said plate, below said jaws being slotted, as and for the purpose set forth.

2. In a device for the purpose set forth, a flat metallic body notched at one of its ends and integrally formed, beyond the notch, and approximately in a line with the longitudinal walls provided by the notch with outwardly extending spring jaws, and the said jaws having their outer edges flared away from each other.

In testimony whereof I affix my signature.

STANLEY KILMINSTER.